(12) United States Patent
Lv et al.

(10) Patent No.: US 11,144,610 B2
(45) Date of Patent: Oct. 12, 2021

(54) PAGE CONTENT RANKING AND DISPLAY

(71) Applicant: International Business Machines Corporation, Armonk, NY (US)

(72) Inventors: Jian Hua Lv, Ningbo (CN); Qi Ruan, Ningbo (CN); Yan Feng Han, Ningbo (CN); Lian Na Wang, Ningbo (CN); Bei Bei Zhan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 16/676,579

(22) Filed: Nov. 7, 2019

(65) Prior Publication Data
US 2021/0141845 A1 May 13, 2021

(51) Int. Cl.
| | |
|---|---|
| *G06F 7/02* | (2006.01) |
| *G06F 16/00* | (2019.01) |
| *G06F 16/954* | (2019.01) |
| *G06F 16/951* | (2019.01) |
| *G06F 40/109* | (2020.01) |
| *G06F 16/2457* | (2019.01) |
| *G06F 16/9538* | (2019.01) |

(52) U.S. Cl.
CPC ...... *G06F 16/954* (2019.01); *G06F 16/24578* (2019.01); *G06F 16/951* (2019.01); *G06F 16/9538* (2019.01); *G06F 40/109* (2020.01)

(58) Field of Classification Search
CPC ............ G06F 16/954; G06F 16/24578; G06F 16/951; G06F 16/9538; G06F 40/109; G06F 40/103
See application file for complete search history.

(56) References Cited

U.S. PATENT DOCUMENTS

| | | | |
|---|---|---|---|
| 9,348,920 B1 * | 5/2016 | Kesin | ............... G06N 20/00 |
| 10,083,248 B2 | 9/2018 | Broman | |
| | (Continued) | | |

OTHER PUBLICATIONS

Dipin et al., "User Friendly Tab Management in Web Browsers," 2019 16th IEEE Annual Consumer Communications & Networking Conference (CCNC), Jan. 11-14, 2019, 4 pages. <https://eeexplore.ieee.org/document/8651881>.

(Continued)

*Primary Examiner* — Bruce M Moser
(74) *Attorney, Agent, or Firm* — Jamar K. Ray

(57) ABSTRACT

A computer-implemented method comprises analyzing content sections on each of a plurality of open browser pages using natural language processing to identify one or more topics on each of the plurality of open browser pages; calculating a respective relevance score for each of the content sections; grouping each of the plurality of topics into one of a plurality of topic groups; calculating a respective group ranking for each of the plurality of topic groups based on the respective relevance score for each content section. The method further comprises, for each topic group, assigning the respective group ranking to all of the content sections corresponding to the respective topic group; and, for each of the plurality of open browser pages, selecting at least one content section having a highest group ranking and modifying a display of the respective open browser page to direct attention to the selected content section.

20 Claims, 7 Drawing Sheets

(56) References Cited

U.S. PATENT DOCUMENTS

| | | | |
|---|---|---|---|
| 2011/0289088 A1* | 11/2011 | Yarin | G06F 16/70 |
| | | | 707/738 |
| 2014/0136506 A1 | 5/2014 | Ratner | |
| 2017/0199638 A1 | 7/2017 | Bhupatiraju | |
| 2017/0293419 A1 | 10/2017 | Dipin | |
| 2019/0065502 A1* | 2/2019 | Lee | G06F 16/24578 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

| Page A | Page B | Page C | Page D |

PA1
asdfasdfasdfasdfasdfasdfasdfasdfasdfasdfasdfasdfa
sdfasdfasfdasfasdfasdf

PA2
;lkj;lkjasd;lkja;sdlkfja;sldkfja;sdkjfa;sdkjfa;sdlkjfa;sdlkfja;sdkjfa;
sdlkfj;alskdjfa;slkdjfa;sldkjf PA3
asdfasdfasdfasdfasdfasdfasdfasdfasdfasdfasdfa
sdfasdfasfdasfasdfasdffj;;as;dlkfja;laskdjfiepoqiwejflaksnc;lkaj
sdfpoiuasd;lkjfamm;lasiduf PA4
Asdf;lkjasdf;lkjasdf;lkjasdf;lkjqw;eflkjqwef;lkjqwefpoijlkn;alksjdf
a;lskdjfa;slkdcmpaosidfj;alisdjfoqiwejf;laksmdf;lasdjf;oij

FIG. 2A

| Page A | Page B | Page C | Page D |

PB1
Poaisdf;ansdfpoasjdfpaosidfaskenapsodifasidnfqwlefnwqefnl akwjenflqwnfalenfalsnfals PB2
Asdpfoijzpoinas;lkg;lkafmapozixndfkwemf;kasmdpoiasdfn;lkas;dlkfnaowienfalksdnflk PB3
;laksdmfpzoim:Lkdfmawkenf;wqfnasdnfa;lksnfa;lskda,sdadfig yiuahds;afna;slkdnf;wqoeifna;osifjaoidsnfawenfa.wenfa.kjnefl kasjneflaksnefaksjnfask.jenfa.skjenf

FIG. 2B

| Page A | Page B | Page C | Page D |

PA1
asdfasdfasdfasdfasdfasdfasdfasdfasdfasdfasdfasdfa
sdfasdfasfdasfasdfasdf

PA2
;lkj;lkjasd;lkja;sdlkfja;sldkfja;sdkjfa;sdkjfa;sdlkjfa;sdlkfja;sdkjfa;
sdlkfj;alskdjfa;slkdjfa;sldkjf PA3
<u>asdfasdfasdfasdfasdfasdfasdfasdfasdfasdfa</u>
<u>sdfasdfasfdasfasdfasdffj;;as;dlkfja;laskdjfiepoqiwejfl</u>
<u>aksnc;lkajsdfpoiuasd;lkjfamm;lasiduf</u>

PA4
Asdf;lkjasdf;lkjasdf;lkjasdf;lkjqw;eflkjqwef;lkjqwefpoijlkn;alksjdf
a;lskdjfa;slkdcmpaosidfj;alisdjfoqiwejf;laksmdf;lasdjf;oij

FIG. 3

PAGE CONTENT RANKING AND DISPLAY

BACKGROUND

It is common for individuals to search for information over the internet using a web browser. Conventional browsers support the opening of multiple tabs and/or windows to display different webpages which enables a user to review multiple pages for information on a given topic and/or to search for information on multiple topics.

SUMMARY

Aspects of the disclosure may include a computer-implemented method, computer program product, and system. One example of the computer-implemented method comprises analyzing one or more content sections on each of a plurality of open browser pages using natural language processing to identify one or more topics on each of the plurality of open browser pages. Each of the one or more content sections on each of the plurality of open browser pages corresponds to a respective one of the one or more topics. The method further comprises calculating a respective relevance score for each of the one or more content sections. The respective relevance score indicates relevance of the respective content section to the corresponding topic. The method further comprises grouping each of the plurality of topics into one of a plurality of topic groups; and calculating a respective group ranking for each of the plurality of topic groups based on the respective relevance score for each content section corresponding to one of the topics in the respective topic group. The method further comprises, for each topic group, assigning the respective group ranking to all of the content sections corresponding to the respective topic group; for each of the plurality of open browser pages, selecting at least one content section having a highest group ranking; and for each of the plurality of open browser pages, modifying a display of the respective open browser page to direct attention to the selected at least one content section having the highest group ranking.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 2A depicts an example browser having a plurality of open browser pages displayed on a display device.

FIG. 2B is another depiction of the example browser of FIG. 2A.

FIG. 3 depicts the example browser of FIG. 2A having a modified display of one of the open browser pages.

Figure 1:
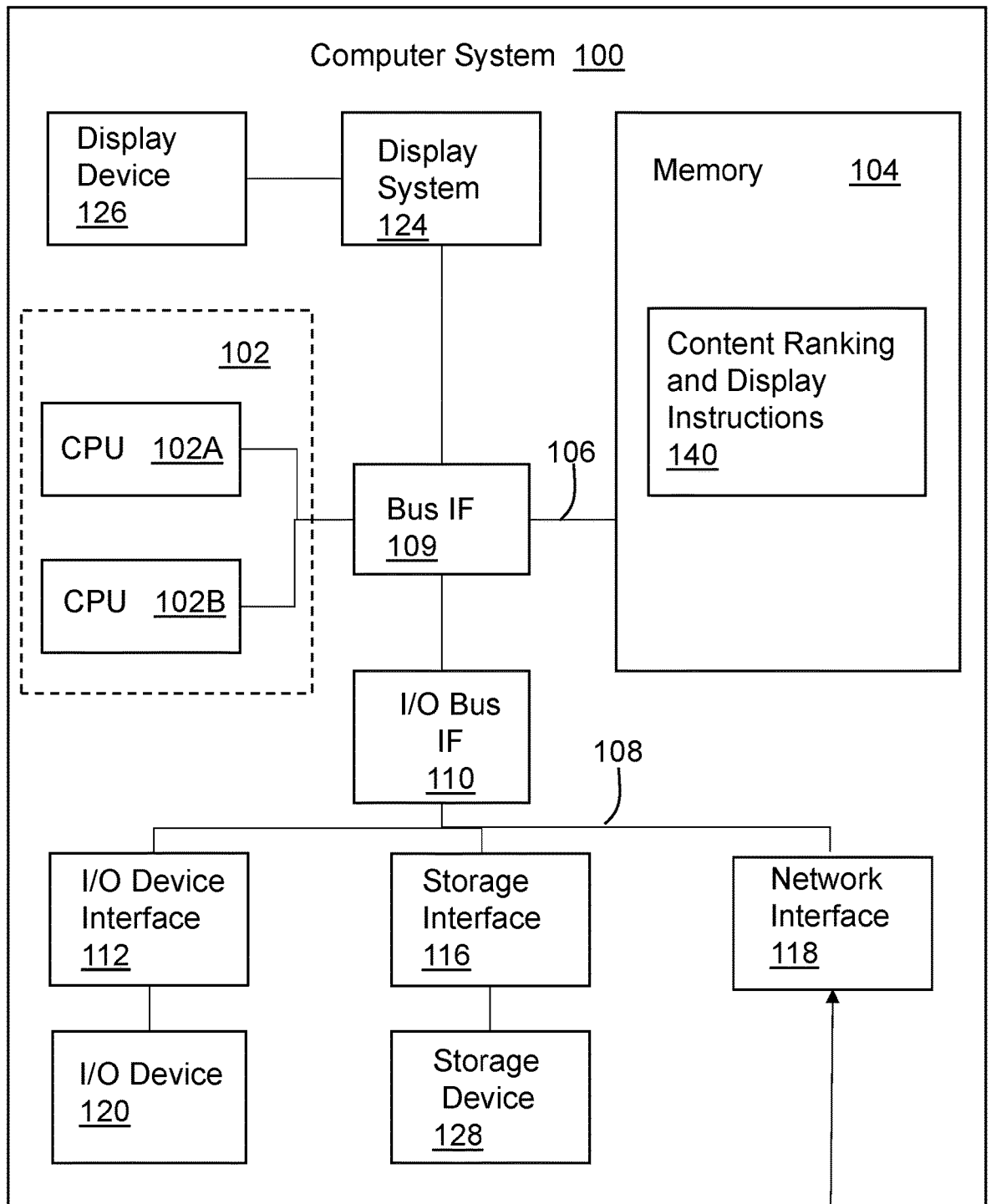
FIG. 1 is a high-level block diagram of one embodiment of an example computer system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 depicts a high-level block diagram of one embodiment of a computer system 100. The components of the computer system 100 shown in the example of FIG. 1 include one or more processors 102, a memory 104, a storage interface 116, an Input/Output ("I/O") device interface 112, and a network interface 118, all of which are communicatively coupled, directly or indirectly, for inter-component communication via a memory bus 106, an I/O bus 108, bus interface unit ("IF") 109, and an I/O bus interface unit 110.

In the embodiment shown in FIG. 1, the computer system 100 also includes one or more general-purpose programmable central processing units (CPUs) 102A and 102B, herein generically referred to as the processor 102. In some embodiments, the computer system 100 contains multiple processors. However, in other embodiments, the computer system 100 is a single CPU system. Each processor 102 executes instructions stored in the memory 104.

In some embodiments, the memory 104 includes a random-access semiconductor memory, storage device, or storage medium (either volatile or non-volatile) for storing or encoding data and programs. For example, the memory 104 stores content ranking and display instructions 140. When executed by a processor such as processor 102, the content ranking and display instructions 140 cause the processor 102 to perform the functions and calculations described herein for automatically identifying and ranking content, as well as modifying a display of the identified content based on the ranking.

In some embodiments, the memory 104 represents the entire virtual memory of the computer system 100 and may also include the virtual memory of other computer systems coupled directly to the computer system 100 or connected via a network. In some embodiments, the memory 104 is a single monolithic entity, but in other embodiments, the memory 104 includes a hierarchy of caches and other memory devices. For example, the memory 104 can exist in multiple levels of caches, and these caches may be further divided by function, so that one cache holds instructions while another holds non-instruction data, which is used by the processor. The memory 104 may be further distributed and associated with different CPUs or sets of CPUs, as is known in any various so-called non-uniform memory access (NUMA) computer architectures, for example.

Hence, although the content ranking and display instructions 140 are stored on the memory 104 in the example shown in FIG. 1 for purposes of explanation, it is to be understood that other embodiments can be implemented differently. For example, the content ranking and display instructions 140 can be distributed across multiple physical media.

Furthermore, in some embodiments, the content ranking and display instructions 140 are executed by the same processor 102. However, in other embodiments, execution of the content ranking and display instructions 140 is distributed across multiple processors located in the same or different computer systems. For example, in some such embodiments, at least a portion of the instructions and data structures associated with the content ranking and display instructions 140 can be on different computer systems and accessed remotely, e.g., via the network interface 118. The computer system 100 can use virtual addressing mechanisms that allow the programs of the computer system 100 to behave as if it only has access to a large, single storage entity instead of access to multiple, smaller storage entities. Thus, the memory 104 can store all or a portion of the various programs, modules, and data structures for providing free-form route generation as described herein.

The content system 100 in the embodiment shown in FIG. 1 also includes a bus interface unit 109 to handle communications among the processor 102, the memory 104, the display system 124, and the I/O bus interface unit 110. The I/O bus interface unit 110 is coupled with the I/O bus 108 for transferring data to and from the various I/O units. In particular, the I/O bus interface unit 110 can communicate with multiple I/O interface units 112, 116, and 118, which are also known as I/O processors (IOPs) or I/O adapters (IOAs), through the I/O bus 108. The display system 124 includes a display controller, a display memory, or both. The display controller can provide video, audio, or both types of data to a display device 126. The display memory may be a dedicated memory for buffering video data. The display system 124 is coupled with the display device 126, such as a standalone display screen, computer monitor, television, a tablet or handheld device display, or other displayable device. In some embodiments, the display device 126 also includes one or more speakers for rendering audio, such as for announcing navigation directions to aid a user traversing a generated free-form route. Alternatively, one or more speakers for rendering audio may be coupled with an I/O interface unit. In alternate embodiments, one or more functions provided by the display system 124 are on board an integrated circuit that also includes the processor 102. In addition, in some embodiments, one or more of the functions provided by the bus interface unit 109 is on board an integrated circuit that also includes the processor 102.

The I/O interface units support communication with a variety of storage and I/O devices. For example, the I/O device interface unit 112 supports the attachment of one or more user I/O devices 120, which may include user output devices (such as a video display device, speaker, fax machine, printer, and/or television set) and user input devices (such as a keyboard, mouse, keypad, touchpad, trackball, buttons, light pen, or other pointing devices). A user can manipulate the user input devices 120 using a user interface, in order to provide input data and commands to the user I/O device 120 and the computer system 100. Additionally, a user can receive output data via the user output devices. For example, a user interface may be presented via the user I/O device 520, such as displayed on a display device, played via a speaker, or printed via a printer.

The storage interface 116 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 is implemented via any type of secondary storage device. The contents of the memory 104, or any portion thereof, may be stored to and retrieved from the storage device 128 as needed. The network interface 118 provides one or more communication paths from the computer system 100 to other digital devices and computer systems, such as the sensors, other user devices, and/or database discussed above.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100, can include multiple I/O bus interface units 110 and/or multiple I/O buses 108 in other embodiments. While multiple I/O interface units are shown, which separate the I/O bus 108 from various communication paths running to the various I/O devices, in other embodiments, some or all of the I/O devices are connected directly to one or more system I/O buses.

As discussed above, in some embodiments, one or more of the components and data shown in FIG. 1 include instructions or statements that execute on the processor 102 or instructions or statements that are interpreted by instructions or statements that execute the processor 102 to carry out the functions as described herein. In other embodiments, one or more of the components shown in FIG. 1 are implemented in hardware via semiconductor devices, chips, logical gates, circuits, circuit cards, and/or other physical hardware devices in lieu of, or in addition to, a processor-based system. In addition, in other embodiments, some of the components shown in FIG. 1 can be omitted and/or other components can be included.

In operation, the processor 102 is configured to execute the content ranking and display instructions 140. For example, the content ranking and display instructions 140 are configured, in some embodiments, to cause the processor 102 to analyze and extract content displayed in an internet browser application ("browser"). In particular, the instructions 140 cause the processor to analyze and extract content displayed in one or more open browser tabs or windows. For example, FIG. 2A depicts one simplified embodiment of an example browser having 4 open tabs labelled in FIG. 2A as Page A, Page B, Page C, and Page D. As known to one of skill in the art, each of the tabs can display information from a respective webpage. For ease of explanation, FIG. 2A depicts the content displayed in Page A and FIG. 2B depicts content displayed in Page B. However, it is to be understood that Page C and Page D also contain content which is analyzed by processor 102 executing instructions 140. Additionally, although 4 tabs are depicted in the examples herein, it is to be understood that, in other embodiments, fewer than 4 or more than 4 tabs can be open and analyzed by the processor 102 executing the instructions 140. In addition, although FIG. 2A and FIG. 2B depicts multiple tabs, it is to be understood that in other embodiments, different browser windows can be used in addition to or in lieu of different browser tabs.

It is to be understood that the content ranking and display instructions 140 can be stand-alone instructions or they can be incorporated into code for other programs. For example, in some embodiments, the content ranking and display instructions 140 are incorporated into a larger body of code for a browser. Additionally, in some embodiments, the content ranking and display instructions 140 are part of a plugin or extension which can be added to a browser or other program.

The instructions 140 cause the processor 102 to use natural language processing techniques known to one of skill in the art to analyze and extract content displayed in the open tabs/windows. For example, natural language processing techniques can include, but are not limited to, semantic similarity, syntactic analysis, and ontological matching. For example, in some embodiments, processor 1020 may be configured to parse text from the open tabs to determine semantic features (e.g., word meanings, repeated words, keywords, etc.) and/or syntactic features (e.g., word structure, location of semantic features in headings, title, etc.) of the textual content. Ontological matching can be used to map semantic and/or syntactic features to a particular concept. The concept can then be used to determine the subject matter or topic of the content. Thus, through the use of natural language processing techniques, the content ranking and display instructions 140 cause the processor to identify one or more topics on from the content of each tab.

For example, in the embodiment shown in FIG. 2A and FIG. 2B, processor 102 determines that page A displays content PA1, PA2, PA3, and PA4 which each relate to respective topics and that page B displays content PB1, PB2, and PB3 which each relate to respective topics. It is to be understood that processor 102 uses the natural language processing techniques to identify content sections and the respective topics of Page C and Page D as well. Table 1 below shows content and the related topics identified by the processor 102 executing content ranking and display instructions 140.

TABLE 1

| Page | Content | Topic | Relevance |
|---|---|---|---|
| Page A | PA1 | Topic 1 | 0.9 |
|  | PA2 | Topic 2 | 0.8 |
|  | PA3 | Topic 3 | 0.9 |
|  | PA4 | Topic 7 | 0.7 |
| Page B | PB1 | Topic 3 | 0.7 |
|  | PB2 | Topic 5 | 0.8 |
|  | PB3 | Topic 7 | 0.9 |
| Page C | PC1 | Topic 1 | 0.9 |
|  | PC2 | Topic 3 | 0.8 |
|  | PC3 | Topic 4 | 0.8 |
|  | PC4 | Topic 5 | 0.9 |
| Page D | PD1 | Topic 2 | 0.9 |
|  | PD2 | Topic 6 | 0.7 |

As shown in Table 1, different sections of each page relate to respective topics. For example, in this embodiment, content PA1 relates to a Topic 1, content PA2 relates to a Topic 2, content PA3 relates to a Topic 3, and content PA4 relates to a Topic 7. Thus, as can be seen in Table 1, some sections of different pages can relate to the same topic. For example, both content section PA2 on Page A and content section PD1 on Page D relate to Topic 2. In addition, the content ranking and display instructions 140 cause the processor 102 determine a relevance of each content section to the identified topic. For example, the processor 102 can implement techniques such as, but not limited to, word ranking techniques (e.g. term frequency-inverse document frequency (TF-IDF)) to determine a relevance score for each content section. For example, using TF-IDF, certain words and terms can be determined to be more relevant to a given document based on the number of times that those words occur in discussion of the topic and based on the number of different documents which use the term in discussing the topic. Thus, in analyzing the content sections of the different open tabs/windows, the processor 102 can identify words in the content section which are more relevant to a given topic and how often those words appear to determine the respective relevance of the that content section to the related topic. It is to be understood that other techniques can be used in addition to or in lieu of the above techniques for determining the relevance of a content section. For example, sentiment analysis can be used in some embodiments in addition to or in lieu of TF-IDF to determine a relevance of a content section to its related topic.

The example Table 1 includes an example relevance score for each content section. The relevance score indicates the relevance of that content section to the identified topic for that content section. For example, the relevance score of content section PA1 indicates the relevance of the content section PA1 to the topic 1. Also, in this example, the relevance score is a value between 0.0 and 1.0 with 1.0 being the most relevant and 0.0 being the least relevant. However, it is to be understood that in other embodiments, other values and scales can be used to indicate relevance of a content section to a topic. For example, in some embodiments, a lower score indicates a higher degree of relevance.

The processor 102 is further configured to group the topics into groups based on similarity in the topics. For example, topic 1 may related to a specific type of vehicles (e.g. trucks) and topic 2 may relate to another type of vehicles (e.g. mini-van). Thus, in such a situation, topics 1 and 2 could be grouped into a broader subject matter group of vehicles which includes all types of vehicles (e.g. trucks, mini-vans, sedans, etc.). The processor 102 can use natural language processing techniques as well as artificial intelligence techniques to group the topics into groups. For example, the processor 102 can use, but is not limited to, one or more of regression algorithms (e.g. linear regression or logistic regression), instance-based algorithms (e.g. k-nearest neighbor or Support Vector Machines), decision tree algorithms, Bayesian algorithms, clustering algorithms (e.g. k-means or hierarchical clustering), etc. to group the topics. Example Table 2 depicts an example grouping of the topics from Table 1 and the corresponding content sections.

TABLE 2

| Topic | Page Content | Content Relevance | Group Ranking |
|---|---|---|---|
| Topic 1 | PA1 | 0.9 | 3.5 |
| (Group A) | PC1 | 0.9 |  |
| Topic 2 | PA2 | 0.8 |  |
| (Group A) | PD1 | 0.9 |  |
| Topic 3 | PA3 | 0.9 | 4.1 |
| (Group B) | PB1 | 0.7 |  |
|  | PC2 | 0.8 |  |
| Topic 5 | PB2 | 0.8 |  |
| (Group B) | PC4 | 0.9 |  |
| Topic 4 | PC3 | 0.8 | 3.1 |
| (Group C) |  |  |  |
| Topic 6 | PD2 | 0.7 |  |
| (Group C) |  |  |  |
| Topic 7 | PA4 | 0.7 |  |
| (Group C) | PB3 | 0.9 |  |

As shown in Table 2, topics 1 and 2 are placed in group A, topics 3 and 5 are placed in group B, and topics 4, 6, and 7 are placed in group C. Table 2 also indicates that content sections PA1, PC1, PA2, and PD1 which relate to topics 1 and 2 also correspond to group A. After grouping the topics, the processor 102 calculates a group ranking score. The group ranking score is based on the respective relevance score for each of the content sections that correspond to the group. For example, in this embodiment, the group ranking score is a sum of the individual relevance scores. Thus, the group ranking score for group A is 3.5 (0.9+0.9+0.8+0.9), the group ranking score for group B is 4.1 (0.9+0.7+0.8+0.8+0.9), and the group ranking score for group C is 3.1 (0.8+0.7+0.7+0.9).

However, it is to be understood that other techniques can be used to determine a group ranking score based on the individual relevance scores. For example, the group ranking scores can be weighted based on the number of different content sections related to a topic, the relevance scores can be multiplied together, and/or the highest individual score can be selected for a group, etc. By basing the group ranking score on the individual relevance scores, the group ranking score takes into account both the relevance of the sections related to a given topic as well as the overall number of content sections related to the topic. In other words, if a user has multiple tabs related to a first topic group and only one tab related to another topic group, the use of the individual relevance scores as discussed above is able to reflect the apparent higher interest in the first topic (as evidenced by the number of open tabs related to the first topic) in the group ranking score. For example, in this example embodiment, each of the content sections in group A has a high relevance score, but the overall group ranking score for group A is lower than the overall group ranking score for group B because group B includes more content sections related to that group.

After calculating a group ranking score, the processor 102 applies or assigns the group ranking score to each of the individual content sections as the content section's content ranking. For example, as shown in Table 3, each of the content sections are assigned the group ranking score for the corresponding group.

TABLE 3

| Page | Content | Topic Group | Content Ranking |
|---|---|---|---|
| Page A | PA1 | Group A | 3.5 |
|  | PA2 | Group A | 3.5 |
|  | PA3 | Group B | 4.1 |
|  | PA4 | Group C | 3.1 |
| Page B | PB1 | Group B | 4.1 |
|  | PB2 | Group B | 4.1 |
|  | PB3 | Group C | 3.1 |
| Page C | PC1 | Group A | 3.5 |
|  | PC2 | Group B | 4.1 |
|  | PC3 | Group C | 3.1 |
|  | PC4 | Group B | 4.1 |
| Page D | PD1 | Group A | 3.5 |
|  | PD2 | Group C | 3.1 |

In addition, processor 102 selects a content section having the highest content ranking for each page (e.g. open tab or window). For example, as shown in Table 3, Page A includes content sections PA1, PA2, PA3, and PA4. Content section PA3 has the highest content ranking on Page A. Thus, for Page A, processor 102 selects section PA3. For Page B, processor 102 selects both content sections PB1 and PB2 since then have the same content ranking. After selecting at least one content section having the highest content ranking for each page, processor 102 modifies the display of each page to direct attention to the selected content section. For example, in some embodiments, the text of the selected content section is modified. As shown in the example FIG. 3, the selected content section PA3 is modified to be depicted with bold lettering and underlining. In other embodiments, the selected content section is highlighted, the text color of the content section is changed, the text size is increased, etc. Additionally, in some embodiments, different colors and/or fonts can be used for each content section based on the group to which each content section is associated. For example, Page A discussed above includes content sections PA1, PA2, PA3, and PA4. Content sections PA1 and PA2 are associated with group A. Content section PA3 is associated with group B. Content section PA4 is associated with group C. Thus, in an embodiment in which each content section is displayed with different colors and/or fonts based on the associated group, content sections PA1 and PA2 can be displayed in orange, content section PA3 in red, and content section PA4 in yellow, for example. In some such embodiments, each content section on different pages corresponding to the same group will have the same font and/or color. In this way, a user can more easily determine to which group topic a given content section pertains. In some such embodiments, the tab or window can be modified to have a border color corresponding to the selected content section (e.g. highest ranking section). In this example embodiment of Page A, the border for Page A would be red to correspond with the highest ranking content section PA3. Additionally, in some embodiments, a color of a tab can match the color of the highest ranking content section in addition to or in lieu of a border around the window or tab to highlight or otherwise direct attention to the content section having the highest rank. In one such example embodiment, Page A, Page B, and Page C would be modified to have red tabs corresponding with group B and Page D would be modified to have an orange tab corresponding to group A since the highest ranking content section on Page D corresponds to group A.

In addition, in some embodiments, modifying the display of the page can include overlaying a notification directing attention to the selected content section in addition to or in lieu of modifying the text of the selected content section. For example, arrows can be displayed on the page pointing to the selected content section, a text box can be displayed indicating which content section was selected, etc. The notification can include a link which scrolls the page to the selected content in response to a click by the user. In other embodiments, modifying the display of the page can include automatically scrolling the page to the selected content section in response to selecting the tab or window. It is to be understood that the embodiments are not limited to those techniques discussed above to direct attention to the selected content section and that multiple techniques can be used together. By modifying the display of the page to direct attention to the selected content section, the embodiments described herein enable a user to more quickly find and read the sections that are of higher interest to the user. For example, a user may be researching a topic and open multiple tabs/windows with different web pages with varying degrees of relevance to the topic of interest. A user may not remember which section of each page contained the information being sought. Through the use of the embodiments described herein, the user is quickly and automatically directed to the section of the page that contains the information of more interest. In other words, the embodiments described herein improve the display of the open webpages to provide more relevant information to the user.

In some embodiments, the user is able to provide feedback on the accuracy of the selected content section such that the system is able to learn and adjust the algorithms used to identify content topics, group topics, and/or rank topics, etc. In addition, it is to be understood that, for each page, the processor 102 can select different content sections. For example, as depicted in the embodiment described above with respect to Table 3, the processor 102 selects content sections related to group B on pages A, B, and C. However, for page D, the processor 102 selects content section PD1 which corresponds to topic 2 of Group A.

The processor 102 can be configured, in some embodiments, to modify the page in response to a user selecting the corresponding tab or window. In other embodiments, the processor 102 can modify the display of the page prior to the user selecting the corresponding tab and then cause the page to be reloaded in response to a user selecting the tab/window. For example, in response to detecting a click on or selection of a tab, the processor 102 causes the page corresponding to the tab to reload with a modified version of the code (e.g. html file) for that page, in some embodiments. The modified version of the code for the page can be stored locally on the user's machine in some embodiments. In other embodiments, the modified version of the code for the page is stored in a database accessed over the internet. Furthermore, in some embodiments, the modified version of the code for the page is stored such that if the tab/window is closed and then reopened at a later date, the modified version of the page is displayed in lieu of the original page.

Figure 5:
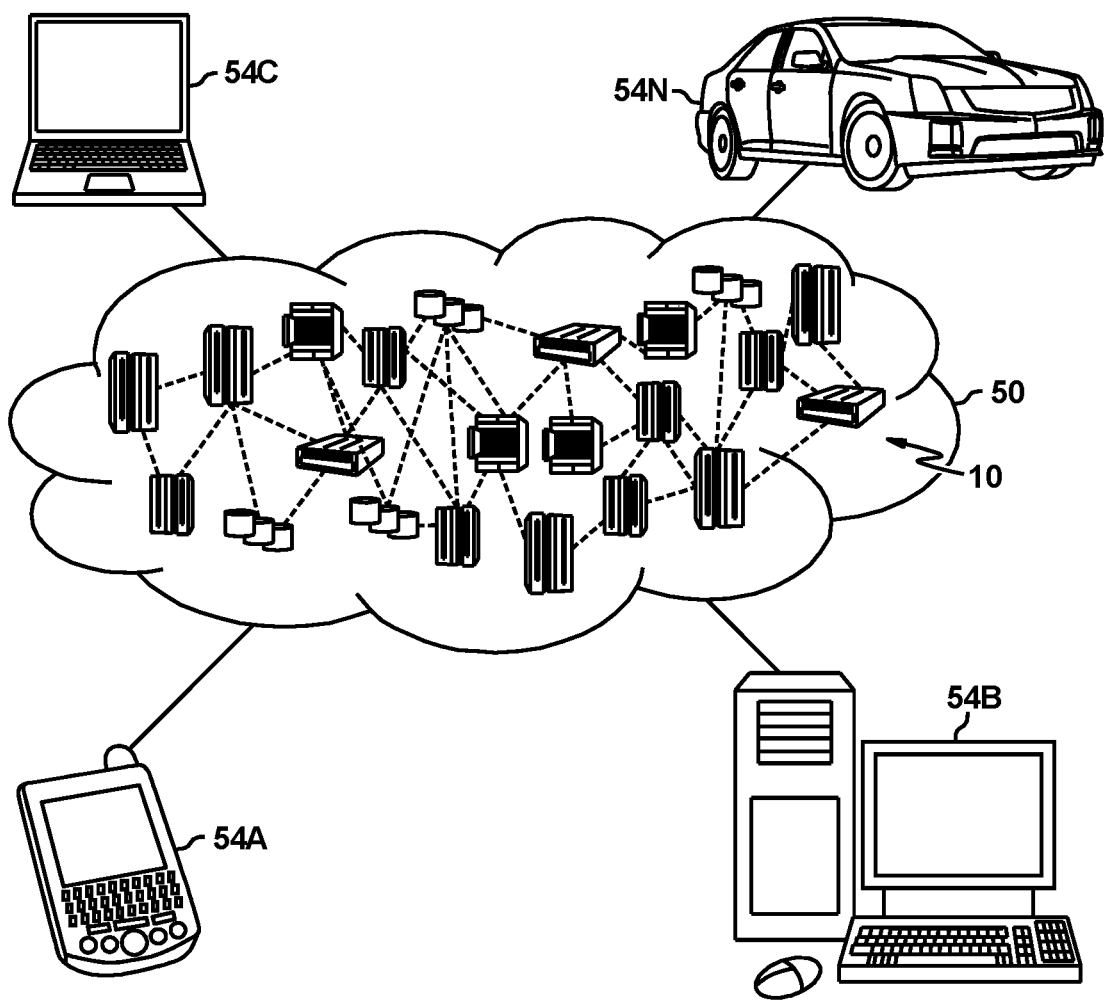
FIG. 5 depicts a cloud computing environment according to an embodiment of the present invention.
Figure 6:
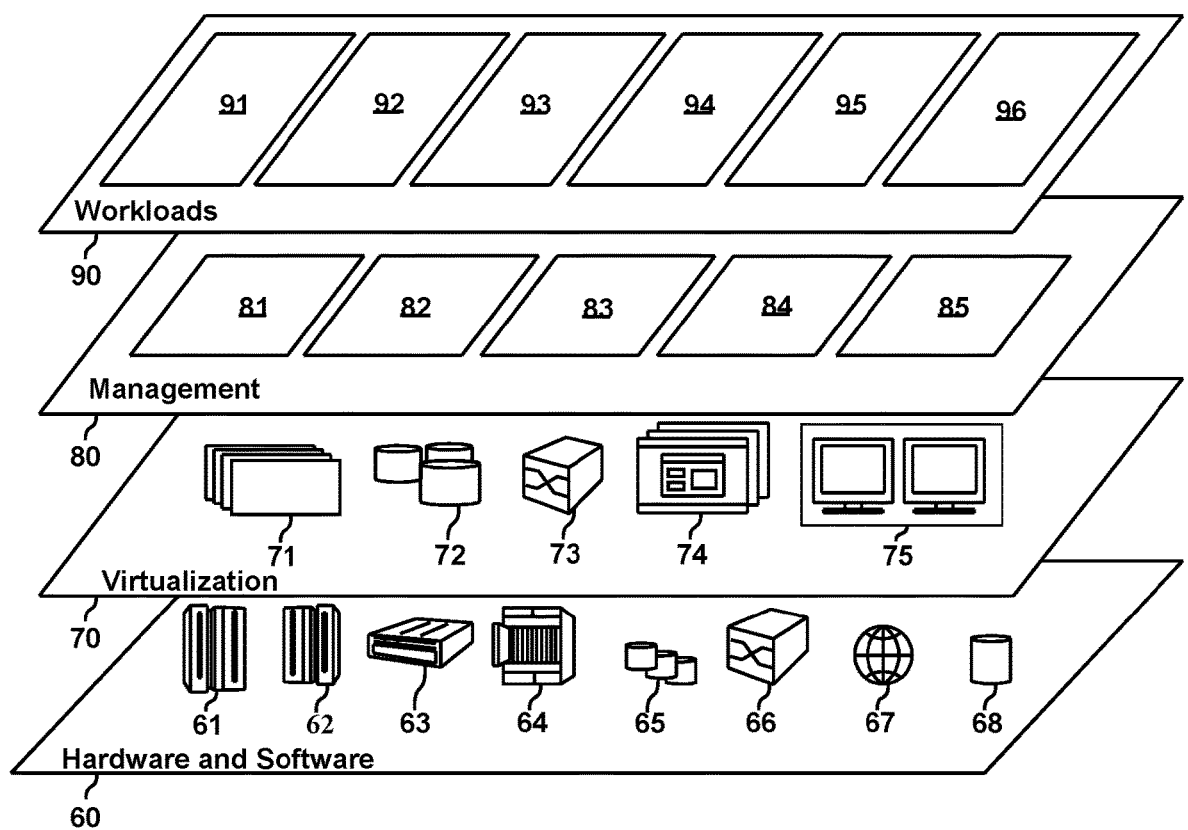
FIG. 6 depicts abstraction model layers according to an embodiment of the present invention.

One example method of selecting content and modifying the display of the selected content by processor 102 is described below with respect to FIG. 4. In addition, in some embodiments, one or more of the functions described herein with respect to processor 102 can be distributed to other systems. For example, in some embodiments, a server communicatively coupled to the computer system 100 performs one or more functions, such as, but not limited to, analyzing the content to identify the content sections and corresponding groups. For example, the server can be communicatively coupled to the processor 102 via the internet and network interface 118. The processor 102 then performs the functions of selecting a content section for each page based on a group ranking score and modifies the display of the page to direct attention to the selected content section in such an example embodiment. FIGS. 5 and 6 described below discuss an embodiment using cloud computing to perform one or more of the functions described herein with respect to processor 102 and content ranking and display instructions 140.

Figure 4:
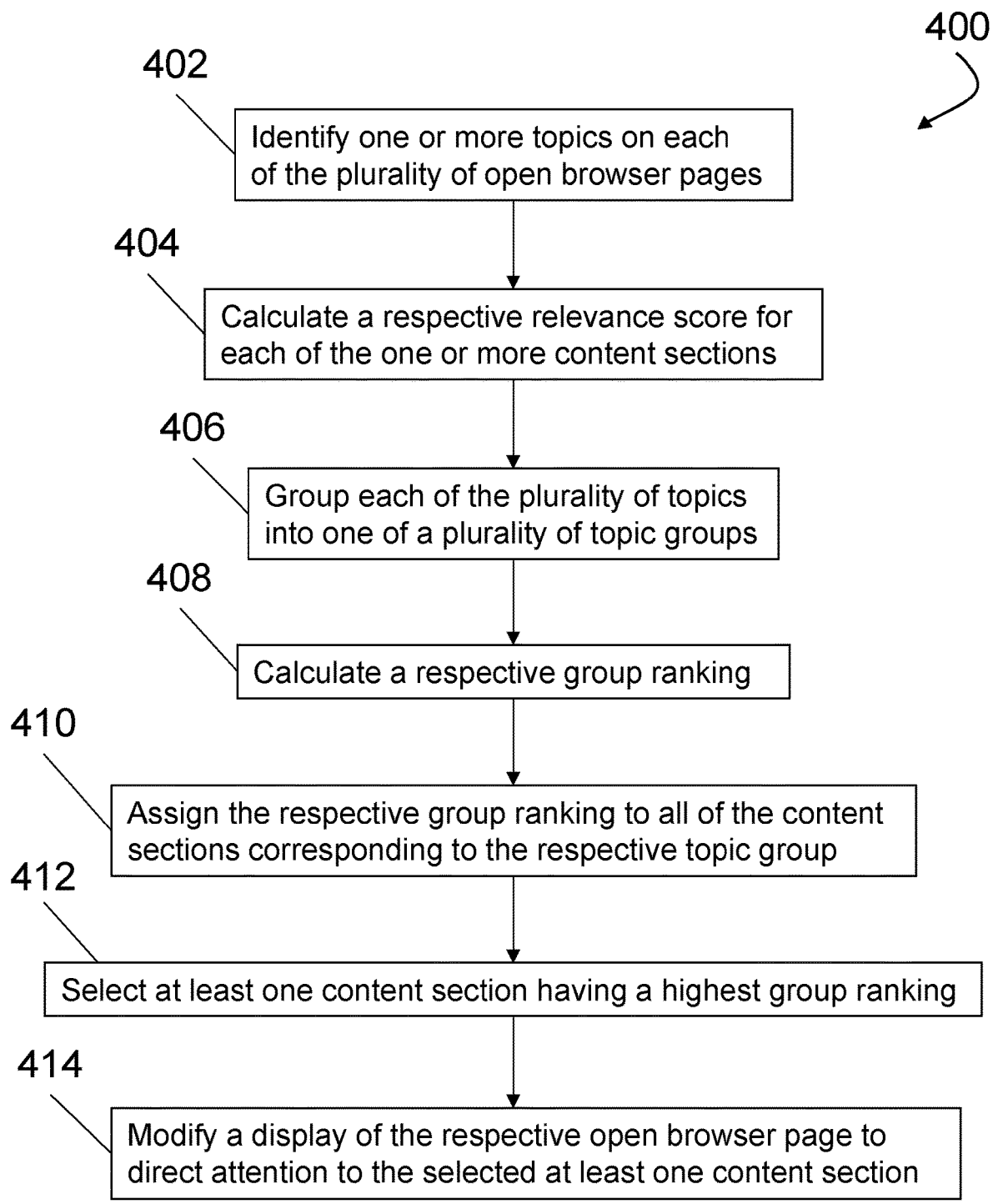
FIG. 4 is a flow chart depicting one embodiment of an example method of ranking and displaying page content.

FIG. 4 is a flow chart depicting one embodiment of a method 400 of ranking and displaying page content. The method 400 can be implemented by a system, such as system 100 described above. For example, the method 400 can be implemented by a CPU, such as CPU 102A or 102B in system 100, executing instructions, such as instructions 140. It is to be understood that the order of actions in example method 400 is provided for purposes of explanation and that the method can be performed in a different order in other embodiments. Similarly, it is to be understood that some actions can be omitted or additional actions can be included in other embodiments.

At 402, one or more content sections on each of a plurality of open browser pages are analyzed using natural language processing to identify one or more topics on each of the plurality of open browser pages, as discussed above. As used herein an open browser page refers to tab or window of a browser which is open and has loaded a respective webpage regardless of whether or not focus is currently placed on the respective browser page. Each of the one or more content sections on each of the plurality of open browser pages corresponds to a respective one of the one or more topics, as discussed above.

At block 404, a respective relevance score for each of the one or more content sections is calculated, as discussed above. The respective relevance score indicates relevance of the respective content section to the corresponding topic. At block 406, each of the plurality of topics is grouped into one of a plurality of topic groups, as discussed above. At block 408, a respective group ranking for each of the plurality of topic groups is calculated based on the respective relevance score for each content section corresponding to one of the topics in the respective topic group, as discussed above. For example, in some embodiments, calculating the respective group ranking comprises summing the respective relevance score for each content section corresponding to one of the topics in the respective topic group, as discussed above.

At block 410, for each topic group, the respective group ranking is assigned to all of the content sections corresponding to the respective topic group, as discussed above. At block 412, at least one content section having the highest group ranking is selected for each of the plurality of open browser pages, as discussed above. At block 414, the display of each open browser page is modified to direct attention to the selected content section for the respective open browser page, as discussed above. For example, the display can be modified in response to shifting focus to the respective open browser page, such as by clicking on the tab or window, as discussed above.

In addition, as discussed above, modifying the display of the open browser page to direct attention to the selected content section can vary in different embodiments. For example, as discussed above, modifying the display can include adjusting display of text of the selected at least one content section, displaying a notification on the open browser page, and/or automatically scrolling the open browser page to the selected at least one content section. As used herein, automatically scrolling the open browser page refers to moving the document up or down such that the selected content section is placed at a predetermined position (e.g. at the top of the screen or at the center of the screen) in order to draw a user's focus to the selected content section. Additionally, as discussed above, adjusting display of text can include adjusting at least one of text size, text font (e.g. typeface, bold, italics, etc.), text underlining, and text highlight. Furthermore, as discussed above, displaying a notification can include displaying a notification with an anchor link (also referred to as a page jump) which causes the displayed page to jump or scroll to the at least one selected content section when clicked and/or one or more arrows indicating the at least one selected content section.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content ranking and display 96. The content ranking and display 96 can be configured to implement one or more of the functions discussed above, in some embodiments.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
   analyzing one or more content sections on each of a plurality of open browser pages using natural language processing to identify one or more topics on each of the plurality of open browser pages, each of the one or more content sections on each of the plurality of open browser pages corresponding to a respective one of the one or more topics;
   calculating a respective relevance score for each of the one or more content sections, the respective relevance score indicating relevance of the respective content section to the corresponding topic;
   grouping each of the plurality of topics into one of a plurality of topic groups;
   calculating a respective group ranking for each of the plurality of topic groups based on the respective relevance score for each content section corresponding to one of the topics in the respective topic group;
   for each topic group, assigning the respective group ranking to all of the content sections corresponding to the respective topic group;
   for each of the plurality of open browser pages, selecting at least one content section having a highest group ranking; and
   for each of the plurality of open browser pages, modifying a display of the respective open browser page to direct attention to the selected at least one content section having the highest group ranking.

2. The computer-implemented method of claim 1, wherein modifying the display of the respective open browser page includes adjusting display of text of the selected at least one content section.

3. The computer-implemented method of claim 2, wherein adjusting display of the text of the selected at least one content section includes adjusting at least one of text size, text font, text underlining, and text highlight.

4. The computer-implemented method of claim 1, wherein modifying the display of the respective open browser page includes displaying a notification on the open browser page.

5. The computer-implemented method of claim 4, wherein displaying a notification on the open browser page includes displaying at least one of a notification with an anchor link to the at least one selected content section and one or more arrows indicating the at least one selected content section.

6. The computer-implemented method of claim 1, wherein modifying the display of the respective open browser page includes automatically scrolling the open browser page to the selected at least one content section.

7. The computer-implemented method of claim 1, wherein calculating the respective group ranking for each of the plurality of topic groups comprises summing the respective relevance score for each content section corresponding to one of the topics in the respective topic group.

8. A computer system comprising:
   a display device configured to display a plurality of open browser pages; and
   a processing unit communicatively coupled to the display device and configured to:
   analyze one or more content sections on each of the plurality of open browser pages using natural language processing to identify one or more topics on each of the plurality of open browser pages, each of the one or more content sections on each of the plurality of open browser pages corresponding to a respective one of the one or more topics;
   calculate a respective relevance score for each of the one or more content sections, the respective relevance score indicating relevance of the respective content section to the corresponding topic;
   group each of the plurality of topics into one of a plurality of topic groups;
   calculate a respective group ranking for each of the plurality of topic groups based on the respective relevance score for each content section corresponding to one of the topics in the respective topic group;
   for each topic group, assign the respective group ranking to all of the content sections corresponding to the respective topic group;
   for each of the plurality of open browser pages, select at least one content section having a highest group ranking; and
   for each of the plurality of open browser pages, output instructions to direct the display device to modify a display of the respective open browser page to direct attention to the selected at least one content section having the highest group ranking.

9. The computer system of claim 8, wherein the processor is configured to direct the display device to modify the display of the respective open browser page by adjusting display of text of the selected at least one content section.

10. The computer system of claim 9, wherein adjusting display of the text of the selected at least one content section includes adjusting at least one of text size, text font, text underlining, and text highlight.

11. The computer system of claim 8, wherein the processor is configured to direct the display device to modify the display of the respective open browser page by displaying a notification on the open browser page.

12. The computer system of claim 11, wherein the processor is configured to direct the display device to display at least one of a notification with an anchor link to the at least one selected content section and one or more arrows indicating the at least one selected content section.

13. The computer system of claim 8, wherein the processor is configured to direct the display device to modify the display of the respective open browser page by automatically scrolling the open browser page to the selected at least one content section.

14. The computer system of claim 8, wherein the processor is configured to calculate the respective group ranking for each of the plurality of topic groups by summing the respective relevance score for each content section corresponding to one of the topics in the respective topic group.

15. A computer program product comprising a computer readable storage medium having a computer readable program stored therein, wherein the computer readable program, when executed by a processor, causes the processor to:

analyze one or more content sections on each of a plurality of open browser pages using natural language processing to identify one or more topics on each of the plurality of open browser pages, each of the one or more content sections on each of the plurality of open browser pages corresponding to a respective one of the one or more topics;

calculate a respective relevance score for each of the one or more content sections, the respective relevance score indicating relevance of the respective content section to the corresponding topic;

group each of the plurality of topics into one of a plurality of topic groups;

calculate a respective group ranking for each of the plurality of topic groups based on the respective relevance score for each content section corresponding to one of the topics in the respective topic group;

for each topic group, assign the respective group ranking to all of the content sections corresponding to the respective topic group;

for each of the plurality of open browser pages, select at least one content section having a highest group ranking; and for each of the plurality of open browser pages, output instructions to direct a display device to modify a display of the respective open browser page to direct attention to the selected at least one content section having the highest group ranking.

16. The computer program product of claim 15, wherein the computer readable program is further configured to cause the processor to direct the display device to modify the display of the respective open browser page by adjusting display of text of the selected at least one content section.

17. The computer program product of claim 16, wherein the computer readable program is further configured to cause the processor to direct the display device to adjust display of the text of the selected at least one content section by adjusting at least one of text size, text font, text underlining, and text highlight.

18. The computer program product of claim 15, wherein the computer readable program is further configured to cause the processor to direct the display device to modify the display of the respective open browser page by displaying a notification on the open browser page.

19. The computer program product of claim 15, wherein the computer readable program is further configured to cause the processor to direct the display device to modify the display of the respective open browser page by automatically scrolling the open browser page to the selected at least one content section.

20. The computer program product of claim 15, wherein the computer readable program is further configured to cause the processor to calculate the respective group ranking for each of the plurality of topic groups by summing the respective relevance score for each content section corresponding to one of the topics in the respective topic group.

* * * * *